US005874681A

United States Patent [19]

Habele

[11] Patent Number: 5,874,681

[45] Date of Patent: Feb. 23, 1999

[54] DEVICE FOR SIGNAL TRANSMISSION, ESPECIALLY FOR A SCREW DRIVING APPARATUS FOR ULTRASONICALLY CONTROLLED TIGHTENING OF A SCREW CONNECTION

[75] Inventor: Michael Habele, Waldenbuch, Germany

[73] Assignee: Robert Bosch GmbH, Stuttgart, Germany

[21] Appl. No.: 700,514

[22] PCT Filed: Feb. 9, 1996

[86] PCT No.: PCT/DE96/00202

§ 371 Date: Jan. 21, 1997

§ 102(e) Date: Jan. 21, 1997

[87] PCT Pub. No.: WO96/27481

PCT Pub. Date: Sep. 12, 1996

[30] Foreign Application Priority Data

Mar. 3, 1995 [DE] Germany ........................ 195 07 389.4

[51] Int. Cl.[6] ........................................................ G01L 3/10

[52] U.S. Cl. ................................ 73/862.325; 73/862.191; 73/862.22; 81/479; 173/181

[58] Field of Search ........................ 73/862.325, 862.191, 73/862.22; 81/467, 469, 478, 480; 173/180, 181, 182, 20

[56] References Cited

U.S. PATENT DOCUMENTS

| | | | |
|---|---|---|---|
| 4,890,501 | 1/1990 | Schumacher | 73/862.325 |
| 5,650,573 | 7/1997 | Bruns et al. | 73/862.191 X |

FOREIGN PATENT DOCUMENTS

| | | | |
|---|---|---|---|
| 345 199 A2 | 6/1989 | European Pat. Off. | B60C 23/00 |
| 0467 262 A1 | 7/1991 | Germany . | |
| 2 086 569 | 5/1982 | United Kingdom | 73/862.325 |

*Primary Examiner*—Joseph L. Felber
*Attorney, Agent, or Firm*—Michael J. Striker

[57] ABSTRACT

A device for signal transmission between components supported so as to be movable relative to one another is proposed. A first conductor is partly accommodated in a first component, while a second conductor is partly disposed in a second component, which is supported rotatably relative to the first component via a bearing. The bearing (21) is electrically insulated from the components by means of an insulating body and an insulating sheath. The first conductor and the second conductor are electrically conductively connected to one another via the bearing. In this way, an interruption-free contact between the first conductor and the second conductor (15) is assured.

9 Claims, 2 Drawing Sheets

DEVICE FOR SIGNAL TRANSMISSION, ESPECIALLY FOR A SCREW DRIVING APPARATUS FOR ULTRASONICALLY CONTROLLED TIGHTENING OF A SCREW CONNECTION

BACKGROUND OF THE INVENTION

The invention is based on a device for signal transmission. One such device is already known (European Patent Disclosure EP 467 262 A1), which has a first conductor, accommodated in a drive spindle, for contacting an oscillating body, and a second conductor, located outside the drive spindle, for contacting a control device. The signal transmission from the first to the second conductor is effected in contact fashion by means of wiper contacts, but can also be done contactlessly, that is, inductively or capacitively. In each case, separate signal transmission means are needed for the purpose.

SUMMARY OF THE INVENTION

In accordance with the present invention, at least one bearing, in particular a roller bearing is provided at the signal transmission means, by means of which bearing the first component is supplied so as to be axially and/or circumferentially displaceable or rotatable relative to the second component, the bearing at least partially comprises electrically conductive material, the bearing is disposed so as to be electrically insulated from both the first component and the second component, and the first conductor and the second conductor are electrically conductively connected to the bearing.

When the device is designed in accordance with the present invention, it has the advantage over the prior art that the signal transmission is effected without expensive separate signal transmission means. In this way, a simple and compact design of the device for signal transmission is possible.

BRIEF DESCRIPTION OF THE DRAWINGS

One exemplary embodiment of the invention is shown in the drawing and described in further detail in the ensuing description.

DESCRIPTION OF THE PREFERRED EMBODIMENT

Figure 1:
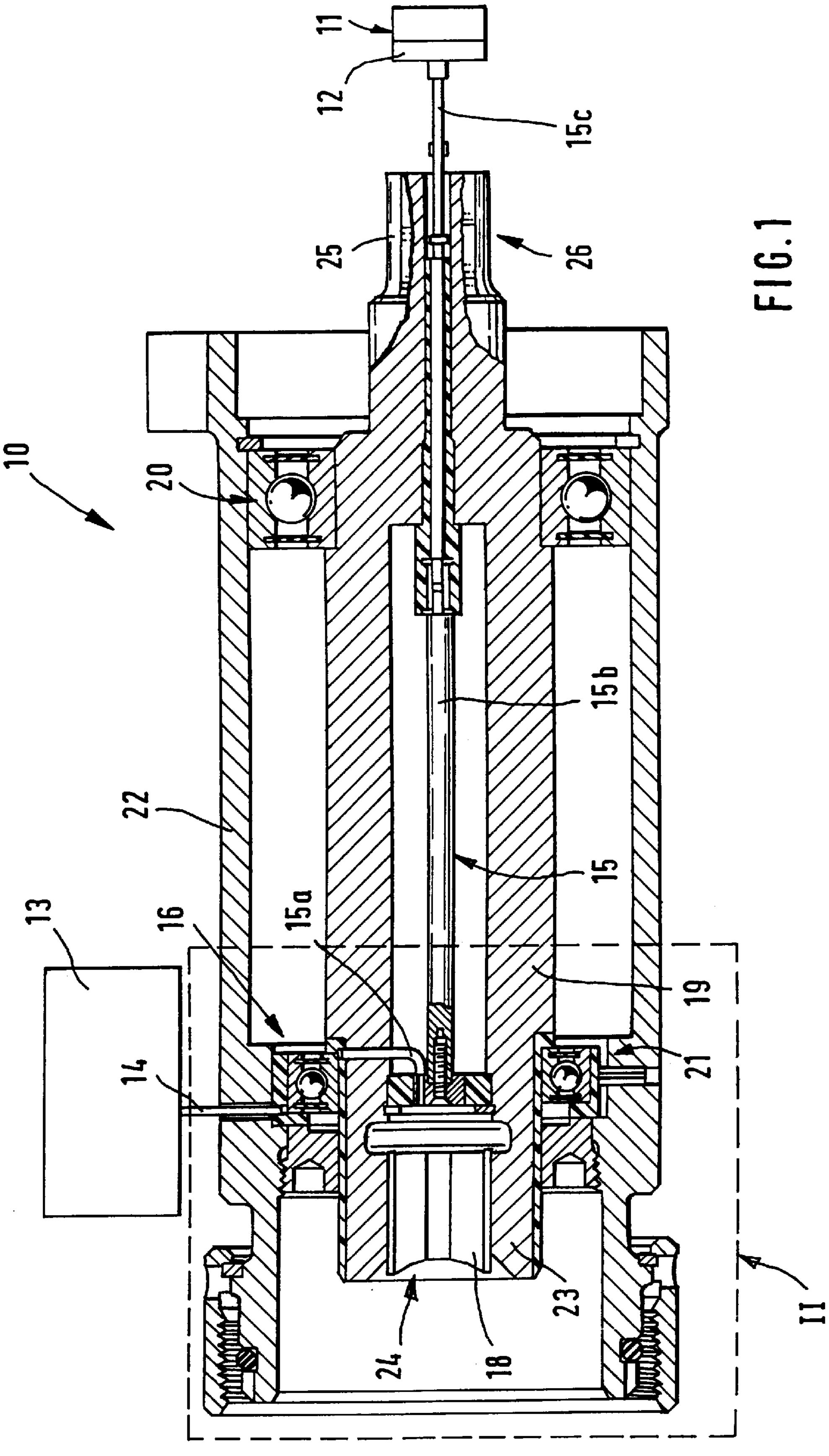
FIG. 1 shows a device for signal transmission in a screw driving apparatus for ultrasonically controlled tightening of screw connections.
Figure 2:
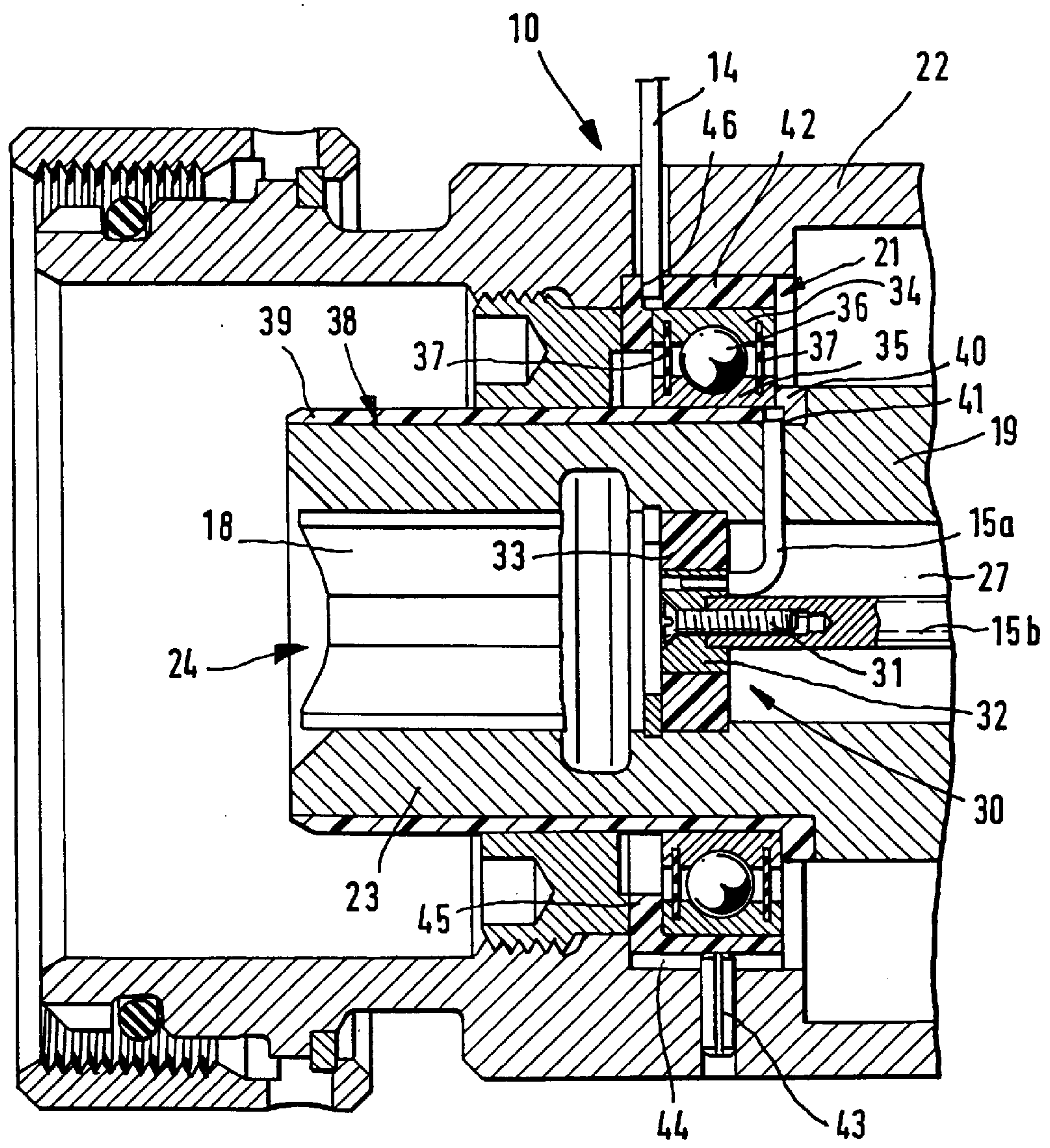
FIG. 2 shows an enlarged view of a detail of FIG. 1 identified by II.

In FIGS. 1 and 2, reference numeral 10 indicates a screw driving apparatus for ultrasonically controlled tightening of the screw connections. In such a screw driving apparatus 10, a prestressing force that may be present in a screw connection 11 shown schematically in FIG. 1 is ascertained by a known ultrasonic transit time measurement process and is used in a control device 13 as a control variable for controlling the screwing operation. Because of the high accuracy with which the prestressing force present in the screw connection 11 can be ascertained, very close tolerances with respect to the attainable set-point screw fastening values can be attained.

The screw driving apparatus 10, for electrical connection of an oscillating body 12 to the control device 13 and conversely, has connecting lines 14, 15. The oscillating body 12 is a piezoelectric crystal by way of example, which with suitable electrical excitation generates high-frequency acoustical oscillations and carries them to the screw connection 11. Conversely, the piezoelectric crystal receives echo oscillations from the screw connection 11 and converts them into associated electrical echo signals. By comparison of the exciter signals and echo signals in the schematically shown control device 13, a conclusion can be drawn in a known manner about the state of tension in the screw connection 11 and hence about the current prestressing force.

The screw driving apparatus 10 is provided with a rotary spindle 19, which is supported in bearings 20, 21 with regard to a hollow-cylindrical housing part 22. On its end 23 toward a drive motor, not shown, the rotary spindle 19 is equipped with rotary slaving means 24, which by way of example are embodied as a receiving opening 18 for an external polygon. A drive shaft, not shown but provided with an external polygon, of a drive motor can be inserted into the receiving opening 18. On its other end 25 toward the screw connection 11, the rotary spindle 19 forms a tool receptacle 26, onto which a screw driving tool, not shown in FIG. 1 and for instance a hexagonal socket can be placed.

Because of the rotatability of the rotary spindle 1 relative to the housing part 22, signal transmission means 16 are needed to transmit signals between the oscillating body 12 and the control device 13. The connecting lines 14, 15 form a first conductor 14, which is partly accommodated in the housing part 22 and whose wall protrudes radially through it. A second conductor 15 is accommodated partly inside the rotary spindle 19. A portion **15*a* of the second conductor 15 protrudes radially through the wall of the rotary spindle 19, and a portion 15*b* passes through the rotary spindle 19 in an axial through opening 27 to the end 15 of the rotary spindle 19. This is adjoined by a portion 15*c*, embodied as a contact pin, by means of which the oscillating body 12** can be contacted electrically conductively.

In FIG. 2, a detail shown in dashed lines and marked II in FIG. 1 is shown in further detail. The rotary spindle 19, rotatably supported in the housing part 22 by means of the bearing 21, can clearly be seen, the second conductor 15 being accommodated with its portions **15*a* and 15*b* inside it. The portions 15*b* and 15*c* are electrically conductively connected at a junction point 30 by means of a screw 31 and a metal sheath 32. An insulator 33 fixes the portion 15*b* of the conductor 15 inside the through opening 27 in the rotary spindle 19. The portion 15*b* of the conductor 15 is formed by a length of cable surrounded by a layer of insulation. The portion 15*a* of the conductor 15** is also surrounded by a layer of insulation.

The electrical contact of the first conductor 14 to the second conductor 15 is effected via the bearing 21, which is embodied as a conventional commercially available roller bearing. The bearing 21 has an outer race 34 and an inner race 35, with roller bodies 36, especially balls, located between them. The outer race 34, inner race 35 and roller bodies 36 are made of electrically conductive material. The bearing 21 may additionally be provided on one or both sides with sealing or cover disks 37, which protect the bearing 21 from the entry of dust and the escape of lubricant. The rotary spindle 19 is offset toward its end 23. An insulating sheath 39 is mounted on the offset spindle portion 38 and is joined to the rotary spindle 19 in a manner fixed against relative rotation, for instance being glued to it. The inner race 35 of the bearing 21 is seated on the insulating sheath 39 and is contacted electrically by the portion **15*a* of the second conductor 15. To that end, in the region of a collar 40 that acts as an axial stop for the inner race 35, the insulating sheath 39 has a bore 41, through which one end of the portion 15***a* protrudes to the inner race 35 and contacts the inner race 35. The outer race 34 of the bearing 21 is likewise seated in an annular insulating body 42, which is located free of play in the housing part 22 and forms a radially inward-protruding collar 45 as an axial stop for the outer face 34. In the circumferential direction, the insulating body 42 is retained by a radial pin 43, which radially engages a longitudinal groove 44 of the insulating body 42 and secures this body against rotation. A bore 46 is also provided in the insulating body 42, through which bore the first conductor 14 extends as far as the outer race 34, electrically contacting it.

Since the roller bodies 36 are supported on the one side of the outer race 34 and on the other on the inner race 35 of the bearing 21, an electrical contact always exists between the outer race 34 and the inner race 35. The resultant resistance established may be reduced, for instance by using a lubricant with good electrical conductivity. Especially when high-frequency signals are transmitted at low rotary speeds (below 500 rpm), the capacitive coupling component becomes especially valuable.

A further electrical contacting of the oscillating body 12, for instance for the connection to ground, can be done in a corresponding way via the housing part 22, the bearing 20, the rotary spindle 19 and the screw driving tool. The bearing 20 for this purpose disposed without insulation between the housing part 22 and the rotary spindle 19. Because of the insulation of the bearing 21 from the rotary spindle 19 and the housing part 22, a closed current circuit can overall be achieved.

The invention is not limited to the exemplary embodiment shown. In particular, signal transmission according to the invention may also be made possible via some other electrically conductive bearing, such as a slide bearing or axial bearing. The signal transmission means 16, may for instance also be provided in a measurement shaft for torque detection. The invention is also applicable quite generally to signal transmission where there are components movable relative to one another, of which a first component, corresponding to the housing part 22, is supported so as to be rotatable and/or displaceable relative to a second component, corresponding to the rotary spindle 19.

I claim:

1. A device for signal transmission between components (19, 22) supported so as to be movable relative to one another, in a screw driving apparatus (10) for ultrasonically controlled tightening of screw connections, having a first component (22), a first electrical conductor (14) at least partially accommodated in the first component (22) and electrically insulated from it, a second component (19) movable relative to the first component (22), with a second electrical conductor (15) at least partially accommodated in it and electrically insulated from it, and having signal transmission means (16), which enable signal transmission from the first conductor (14) to the second conductor (15) and vice versa, characterized in that at least one bearing (21), in particular a roller bearing, is provided as the signal transmission means (16), by means of which bearing the first component (22) is supplied so as to be axially and/or circumferentially displaceable or rotatable relative to the second component (19); that the bearing (21) at least partly comprises electrically conductive material; that the bearing (21) is disposed so as to be electrically insulated from both the first component (22) and the second component (19); and that the first conductor (14) and the second conductor (15) are electrically conductively connected to the bearing (21).

2. The device of claim 1, characterized in that the first component (22) is embodied as a housing part, and the second component (19) is embodied as a rotary spindle.

3. The device of claim 1, characterized in that the conductors (14, 15), via the bearing (21), electrically conductively connect a control device (13) to a measuring instrument (12) of the screw driving apparatus (10).

4. The device of claim 1, characterized in that the bearing (21) is embodied as a roller bearing, with an outer race (34), an inner race (35), and roller bodies (35) between them, all of which are made of electrically conductive material.

5. The device of claim 4, characterized in that an annular insulating body (42) is disposed between the first component (22) and the outer race (34) of the bearing (21), and an insulating sheath (41) is disposed between the second component (15) and the inner race (35) of the bearing (21).

6. The device of claim 5, characterized in that the insulating sheath (41) and the insulating body (42) are disposed in a manner fixed against relative rotation relative to the second component (19) and the first component (22), respectively.

7. The device of claim 6, characterized in that the second component (19) has an offset cylindrical end (23), to which the insulating sheath (41) is glued.

8. The device of claim 5, characterized in that the insulation sheath (41) and the insulating body (42) are provided with collars (40, 45), which act respectively as an axial stop for the inner race (35) and the outer race (34).

9. The device of claim 1, characterized in that the first component (22) is electrically conductively connected to the second component (19) via a second bearing (20).

* * * * *